United States Patent [19]

Shepherd

[11] 4,403,421
[45] Sep. 13, 1983

[54] TELESCOPIC GUN SIGHT

[76] Inventor: Daniel R. Shepherd, R.R. #1, P.O. Box 23, Waterloo, Nebr. 68069

[21] Appl. No.: 206,668

[22] Filed: Nov. 13, 1980

[51] Int. Cl.³ .......................... F41G 1/38; F41G 1/42
[52] U.S. Cl. ...................................... 33/246; 33/298; 350/550
[58] Field of Search ................ 33/246, 245, 297, 298; 350/10, 54

[56] References Cited

U.S. PATENT DOCUMENTS

| | | | |
|---|---|---|---|
| 1,006,699 | 10/1911 | Straubel | 350/10 |
| 2,094,623 | 10/1937 | Stokey | 33/246 X |
| 2,150,629 | 4/1938 | Mossberg . | |
| 2,823,457 | 2/1958 | Mihalyi | 33/298 |
| 2,891,445 | 3/1959 | Staubach . | |
| 2,949,816 | 1/1960 | Weaver . | |
| 2,955,512 | 4/1960 | Kollmorgen et al. . | |
| 3,313,026 | 4/1967 | Akin, Jr. | 33/246 |
| 3,392,450 | 1/1968 | Herter et al. . | |
| 3,777,404 | 12/1973 | Oreck | 33/245 |

*Primary Examiner*—William D. Martin, Jr.
*Attorney, Agent, or Firm*—Allegretti, Newitt, Witcoff & McAndrews, Ltd.

[57] ABSTRACT

A telescopic sight including primary and secondary reticules separately disposed within separate image planes formed at respective opposite ends of an inverting tube. The secondary reticule is selectively retractable between a first position lying within the field of view of the scope and a second position lying outside the field of view of the scope. A pair of control knobs provide independent adjustability to relatively position the separate reticules with respect to the image viewed through the scope. The secondary reticule is mounted for selective presentation of one of a plurality of reticule surfaces carried by the reticule, with each reticule surface bearing engraved indicia for determining target range and for compensating for bullet drop.

20 Claims, 15 Drawing Figures

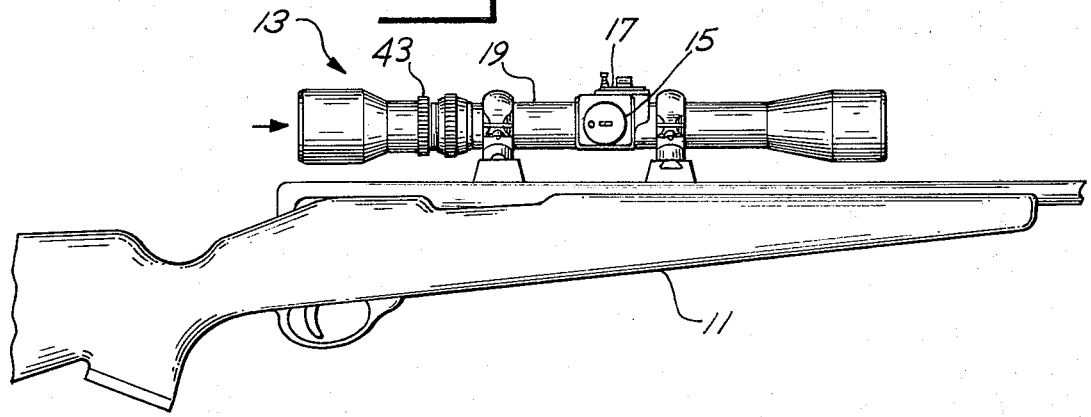
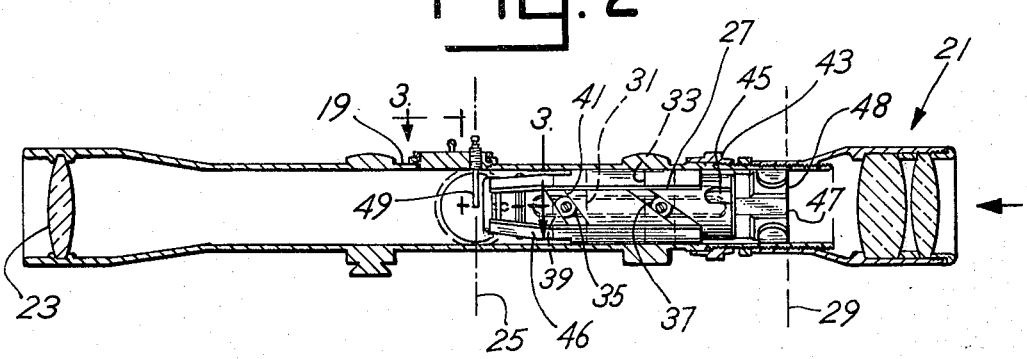
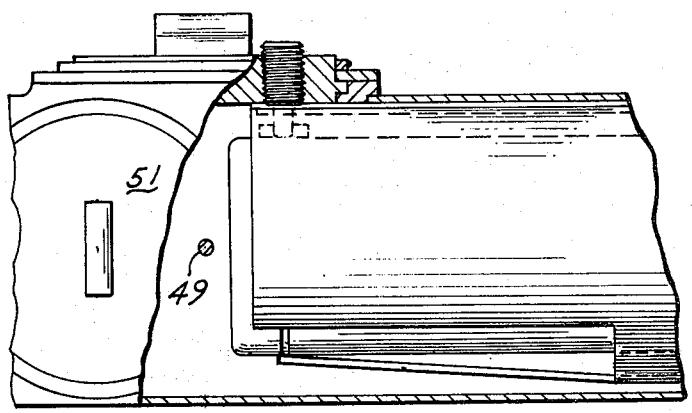
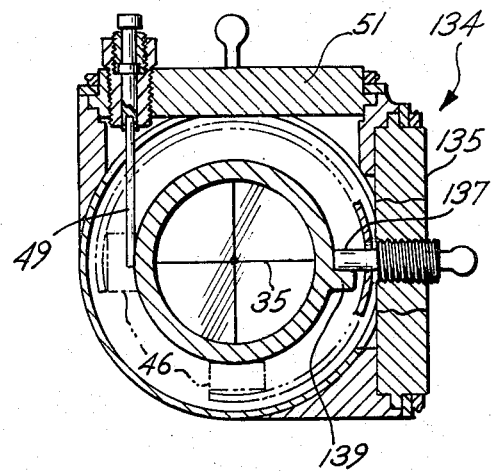

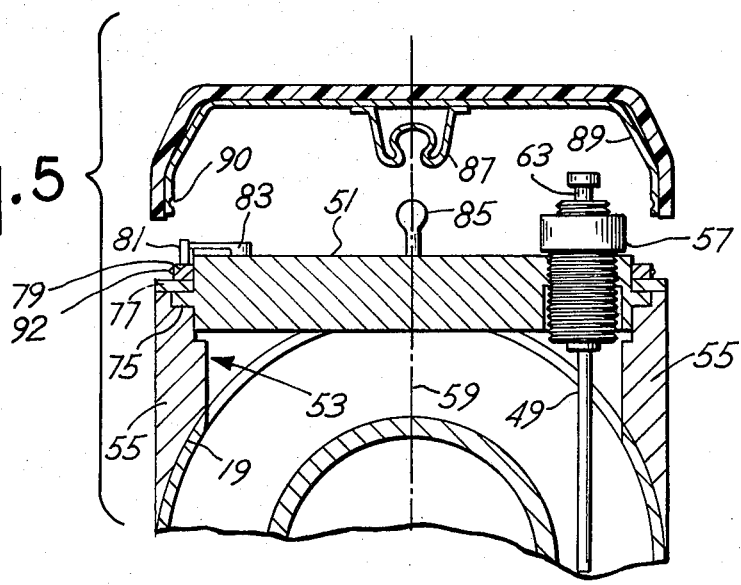
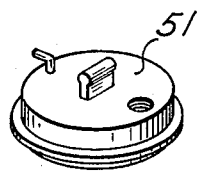
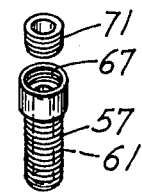
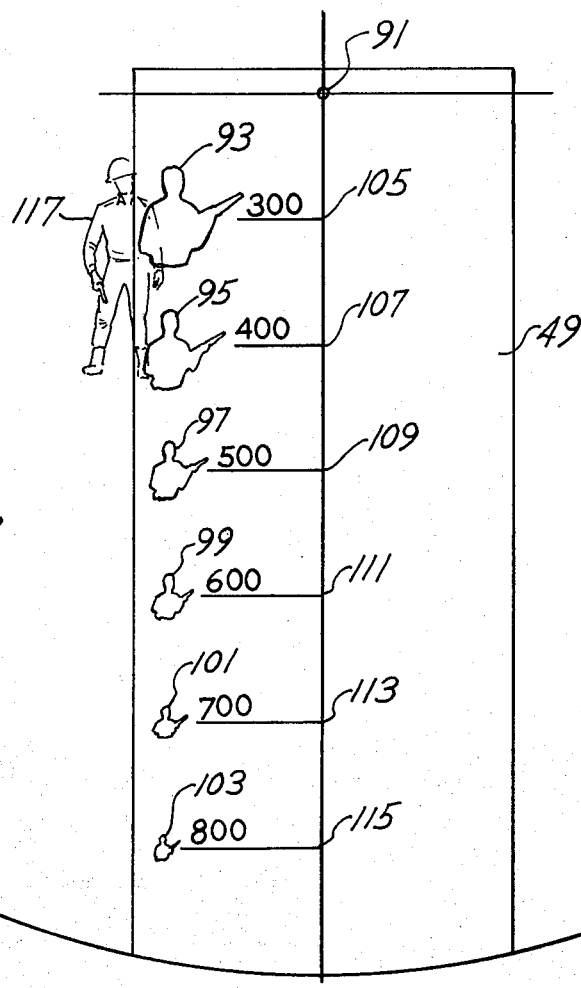
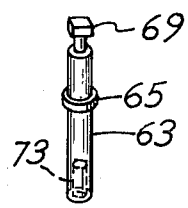

TELESCOPIC GUN SIGHT

BACKGROUND OF THE INVENTION

The invention relates to telescopic sites for use in connection with firearms.

Present telescopic sites used on rifles and other firearms, generally comprise a cross-hair reticule positioned within the scope for referencing the hunter's vision with respect to a target. A hunter "sights in" or "zeros" the scope by firing bullets in a trial-by-error method and repetitively adjusts the reticule in the scope until the center of the cross-hair of the reticule aligns with the impact position of the bullet on the target. Such a method of zeroing a rifle requires considerable time and the costly firing of bullets.

U.S. Pat. No. 2,094,623 issued to F. E. Stokey in 1937, discloses a telescopic sight in which two reticules are utilized to enable the rifle to be zeroed in with a single shot. The Stokey device, however, was quite expensive and complicated. Also, because the hunter always views two reticules within his field of vision through the scope, it was quite possible that the hunter would inadvertently sight on the incorrect reticule. Also, the reticule which was sited in on target, could be off center from the field of vision through the scope causing further confusion and irritation to the hunter. Further, the hunter was shooting upside down with the Stokey scope, because the image through the scope was inverted due to the use of an objective and an ocular lens.

While the Stokey scope of 1937 suggested one-shot sighting, the inherent disadvantages, expense and complication of the system voided its general use. Since 1937, the prior art has suggested the use of an inverting tube to erect the object to be viewed through the scope by the hunter thus, eliminating upside down shooting by the hunter. The use of an inverting tube further establishes the center of the cross-hair wires at the center of the scope's field of vision despite adjustment of the cross-hair reticule relative to the image being viewed. The advent of the inverting tube was thus well received by the hunter.

When using an inverting tube within a scope, the reticule is positioned at the eye piece end of the tube. This is because the positioning of the reticule at the object end of the inverting tube causes the magnification of the cross-hairs of the reticule at high powers of the scope, particularly where the scope has zoom capabilities for changing the object's magnification. Such magnification of the cross-hair wires is annoying to the hunter, blocking portions of his view. Thus, present day scope manufacturers utilize an inverting tube with cross hair wires positioned at the eye piece end of the inverting tube.

Besides the problem of multiple firings to sight-in present day scopes, a problem of parallax exists when using the scope to shoot at close range. Parallax is caused by the cross-hair wires lying outside the image plane in conjunction with the hunter varying the position of his eye relative to the scope as he does not each time look across the cross-hairs at the same visual angle.

Further problems with such conventional scopes include the addition of devices which serve to approximate range and determine the "hold over" or aiming point in view of the range of the target. Particularly, the rifleman must judge the distance of the object and then compensate for the drop of the bullet in view of the weight and velocity of the bullet. Thus, the hunter must point the scope above the target in order for the bullet to drop onto the target.

Such range finding devices include, for example, the use of a transparent reticule disc at one end of an inverter tube, which bears separate circles for denoting range, see for example U.S. Pat. No. 3,392,450 issued to G. L. Herter et al. on July 16, 1968. Other such range defining devices include stadia lines which take the form of two parallely disposed horizontal lines positioned across the field of view of the hunter for his use to determine whether the object fits within the lines in order to gauge distance of a targeted object.

All of these range finding devices add clutter to the hunter's field of vision and are particularly annoying when the hunter is shooting at close range and thus not using the range finding devices.

SUMMARY OF THE INVENTION

It is, therefore, an object of the present invention to provide an improved telescopic sight which adds the advantages of the prior art without their attending disadvantages.

It is yet another object of the invention to provide a telescopic sight having an erect image which may be zeroed in with a single shot.

It is yet another object of the present invention to provide a telescopic sight for use with a firearm, including an auxiliary reticule which may be retractable from the field of vision of the telescopic sight after the rifle has been zeroed.

It is yet another object of the present invention to overcome the problem of parallax, particularly during close range shooting by the hunter.

It is yet another object of the present invention to provide a range finder suitable for telescopic sight use which range finder is quickly adjustable for compensating for change in bullet weight, or the like.

It is a further object of the present invention to provide a range finding device for use in telescopic sights which uses a minimal amount of scope sight area and is simple to use even by the most inexperienced shooter.

These and other objects of the invention are achieved by an auxilliary reticule. In one novel embodiment, the auxilliary reticule is retractable to a position outside of the field of view of the scope. In another novel embodiment, the auxilliary reticule includes a plurality of visual surfaces bearing range finding indicia, with such surfaces being separately selectable by the shooter.

BRIEF DESCRIPTION OF THE DRAWINGS

FIG. 1 is a side view of a rifle having a telescopic sight embodiment of the present invention.

FIG. 2 is a center sectional view of the telescopic sight embodiment of FIG. 1, particularly showing inverting tube 27 rotated 45° from its normal position in order to illustrate its erecting lens moving structure.

FIG. 3 is a sectional plan view taken along 3—3 of the telescopic sight embodiment of FIG. 2.

FIG. 4 is a general cross sectional view of the telescopic sight embodiment of FIG. 1.

FIG. 5 is a portion of a cross sectional view of the secondary reticule control of the telescopic sight embodiment of FIG. 1.

FIGS. 6A through 6D are perspective views of components forming the reticule control of FIG. 5.

FIG. 7 is a scope view of one embodiment of the secondary reticule of FIG. 5.

DESCRIPTION OF THE PREFERRED EMBODIMENT

Figure 8:
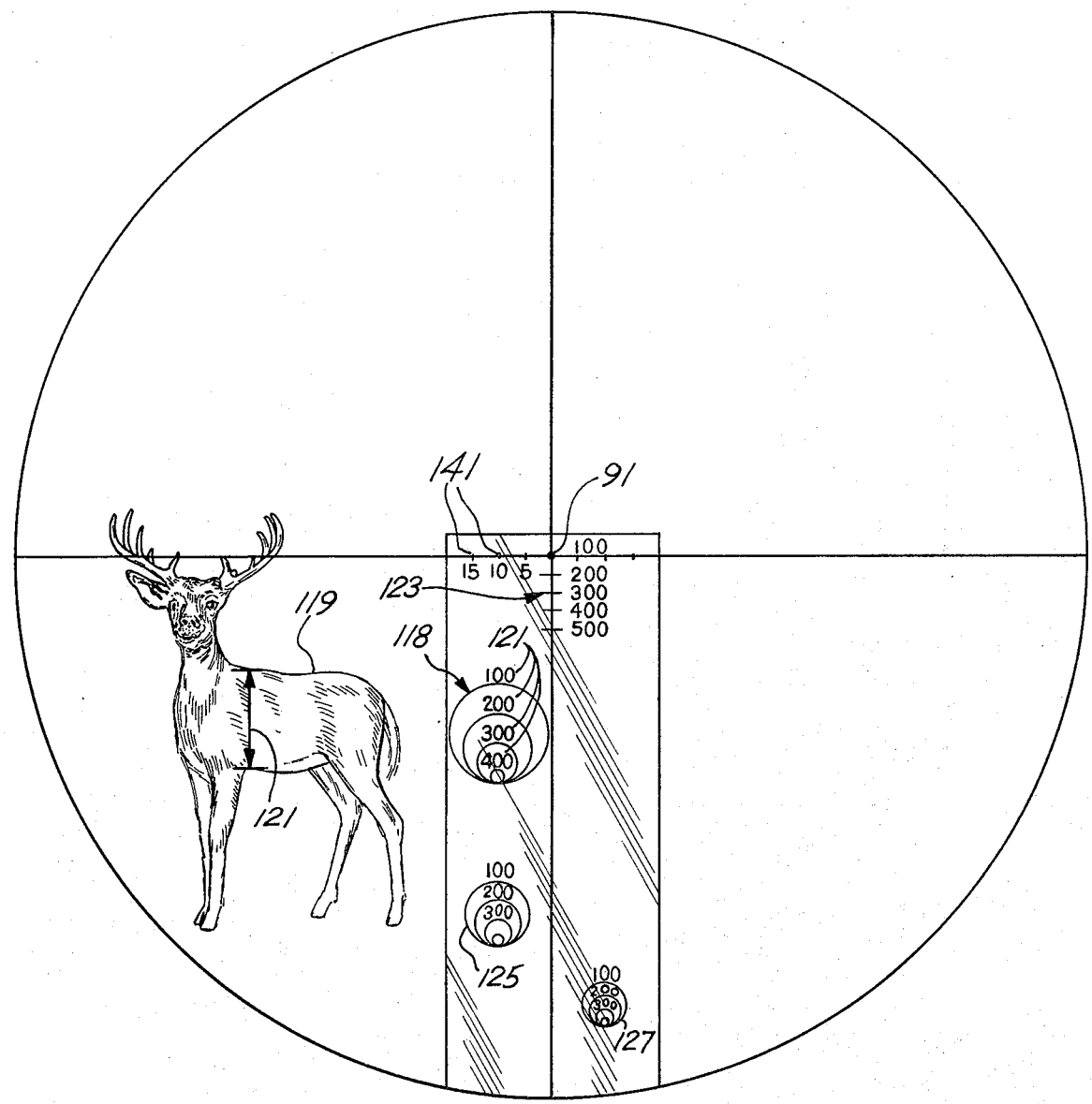
FIG. 8 is a scope view of another embodiment of the secondary reticule of FIG. 5.

Referring to FIG. 1, a rifle 11 includes a telescopic sight or scope 13 mounted atop the gun barrel of the rifle in a conventional fashion. The scope includes a pair of reticule adjustment knobs 15, 17 disposed along the outside of the tubular housing 19 of the scope, for permitting the hunter to selectively adjust the effective position of a pair of sighting reticules disposed within the scope, in order to properly sight-in the rifle.

As illustrated in FIG. 2, the scope includes an eye piece end comprising an ocular lens system 21 through which the hunter views during siting of a target upon which he wishes to fire. The other end of the scope is the objective end and includes an objective lens 23 which is directed toward the object to be viewed. The light rays coming from the object pass through objective lens 23 and converge to form an image on an image plane generally defined by reference numeral 25. Because the image appearing in the image plane will be the inverted image of the viewed object, an inverter tube 27 (shown in FIG. 2 rotated 45° from its normally fixed position within housing 19) is disposed between the image plane and the ocular lens for erecting the image for upright presentation as a second intermediate image in a second image plane generally defined by reference numeral 29. The second image plane lies at the focus of the ocular lens for presenting the erected image to the eye of the hunter, as understood.

Inverter tube 27 includes erecting lenses 31, 33 positioned in a conventional fashion for erecting the image received by the inverting tube. Each of lenses 31, 33 includes a camming arm 35, 37, respectively, for following a camming groove 39 formed in the side of a first tubular housing of tube 27 and for following a second camming groove 41 formed in the side of a second tubular housing encompassing the first tubular housing of tube 27. Lenses 31, 33 are moved along groove 39 during zooming of the scope by a rotatable ring 43 (FIG. 1) which is connected to a slot 45 formed in the second tubular housing of tube 27. As ring 43 is turned by the hunter, the second tubular housing rotates relative to the first tubular housing for moving lenses 31, 33 along groove 39. Camming groove 41 is constructed for moving erecting lenses 31, 33 in a predetermined relationship in order to vary the magnification of the object image appearing in plane 29, as understood.

Inverting tube 27 is encased by a metalic support member 46 which serves to bias tube 27 against an adjustment control (137 FIG. 4) one side of the support member to aid in mechanically adjusting the line of sight of inverting tube 27 by adjustment knob 15 (FIG. 1), as described hereinafter. Further, a field lens (not shown) may be disposed at the front of the inverting tube for widening the field of view, if desired.

A primary reticule 47 comprising a pair of cross-hair wires is fixed with respect to housing 19 at the ocular end of inverter tube 27. The cross-hair wires of reticule 47 serve as reference lines for siting the weapon by the hunter. A diaphragm 48 may be positioned at the ocular end of inverter tube 27 for defining the hunter's field of vision for directing his sight solely through the inverter tube and prohibiting viewing along the sides thereof, i.e., between the inverter tube and the tubular housing 19.

The inverter tube is secured in a substantially fixed relationship with respect to housing 19 at the ocular end of the inverting tube, while the objective end of the inverting tube is movable relative to the walls of tubular housing 19 and metalic support 46. The inverting tube may be adjusted by a single knob 15, as described hereinafter, or may be adjusted by a pair of adjustable screws passing through housing 19 and disposed at right angles to each other; one screw for vertical movement of the inverting tube against the bias provided by metalic support 46 and the other screw for horizontal movement of the objective end of the inverting tube against the bias provided by metalic support 46.

Movement of the objective end of the inverting tube serves to position primary reticule 47 relative to the image plane 25 for positioning the image with respect to the primary reticule as viewed by the hunter. Such inverter tubes have been used previously in scope sights; see for example U.S. Pat. No. 2,995,512 issued to Kollmorgen et al on Oct. 11, 1960.

The use of the inverting tube permits the primary reticule to have the center of the cross-hair wires always in the center of the field of vision of the hunter through scope 13. This is most preferable to the hunter and avoids any confusion caused by the cross hairs being positioned off-centered due to adjustment by the hunter to indicate the center of the scope with respect to the gun barrel. Thus, the line of site of scope 13 is along an optical axis which passes through the eye piece lens system, the inverting tube and the objective lens, and has the center of the cross-hair reticule at the center of the field of vision of the hunter.

A secondary reticule 49 is positionable in image plane 25 for movement therewithin independently of the movement of inverter tube 27. As shown in more detail in FIGS. 3, 4 and 5, secondary reticule 49 is mounted to a platform 51 which is rotatable within an aperture 53 formed in a collar 55. The collar is secured to housing 19 over an aperature formed in the scope housing to permit the secondary reticule to depend from the platform into the image plane. Knob 17 (FIG. 1) controls the movement of reticule 49. In order to make the scope gas tight, a sealing ring of rubber, or the like, may be selectively mounted between the surfaces of platform 51 and collar 55, as will suggest itself. Further, frictional brakes may be utilized in a conventional manner to establish the turning force necessary to rotate platform 51 relative to collar 55.

A reticule carrying member 57 is threadably mounted to platform 51 for movement relative thereto, providing vertical adjustment to reticule 49 within the image plane. Member 57 is offset from rotational axis 59 of the platform at a radial distance to permit the reticule to move out of the field of view of the hunter, as illustrated in FIG. 4.

Platform 51 and the components associated with the secondary reticule are illustrated in more detail in FIGS. 6A through 6D. Reticule carrying member 57 includes a hollowed portion 61 (FIG. 6B) passing through its central axis for receiving a reticule holder 63 (FIG. 6C). Reticule holder 63 includes a bearing surface 65, cylindrical in shape, formed at the upper end of holder 63. Bearing surface 65 is positioned within a bearing slot 67 of reticule carrying member 57 for relative rotation thereto.

A handle portion 69 of reticule support 63 extends above reticule carrying member 57 for permitting manual rotation of reticule holder 63 by the hunter. During assembly, reticule holder 63 is slipped within hollowed portion 61 of the reticule carrying member, and a threaded cap member 71 is slid over handle portion 69 and screwed within the upper portion of hollowed portion 61 for retaining the reticule holder within the carrying member. As will suggest itself, sealing means may be positioned between holder 63 and member 57 to form an air-tight seal.

Reticule holder 63 includes an aperture 73 formed in its lower end for receiving the upper end of reticule 49 as illustrated in FIG. 5. Reticule 49 is cemented within aperature 73 by a rubber shock absorbing cement or the like.

Referring to FIG. 5, platform 51 rests on a bearing surface 75 formed in the aperture of collar 55. A retaining plate 77 is secured atop collar 55, as shown, for retaining platform 51 on bearing surface 75 and permitting free rotation of the platform. A manually movable stop limit ring 79 rests atop retaining plate 77 for rotational movement around the perimeter of platform 51 about axis 59.

Stop limit ring 79 includes a first stop member 81 which is mounted in a fixed relationship to stop limit ring 79. A second stop member 83 is connected to platform 51 and is positioned for contacting stop member 81 during rotation of platform 51. Stop limit ring 79 is manually fixable relative to plate 77, along the perimeter of platform 51, for positioning stop member 81 at a location to contact stop 83 during rotation of platform 51.

Stop member 81 serves to stop the further rotation of platform 51 in order to set reticule 49 in a predetermined horizontal location in image plane 25. As will suggest itself, limit ring 79 may be locked and released from a fixed relationship with respect to retaining plate 77 by various means, including various quick release locking mechanisms known in the art, or friction holding clips secured to plate 77 and overlappable to ring 79, or screw clamps, or screw securements between ring 79 and plate 77, etc.

Once the hunter has determined the appropriate position for reticule 49 within the image plane, the hunter rotates ring 79 until stop 81 contacts stop 83; the hunter then locks ring 79 relative to plate 77. The reticule 49 may then be rotated out of the field of vision of the hunter, as shown in FIG. 4, and thereafter quickly returned to the appropriate position as defined by stop 81.

A cap member 89 carries a depending spring member 87 for mating with a lug member 85 carried by platform 51. The cap member also carries an indentation 90 for mating with protuburence 92 carried by ring 79. After the stop ring 79 has been locked into a fixed position, cap 89 is pressed over lug 85 such that manual rotation of cap 89 by the hunter serves to rotate platform 51 to and from the stop position defined by stop 81. Once the hunter has set stop 81, he may then place cap 89 into position for use to quickly rotate reticule 49 into a defined position in image plane 25.

When sighting the rifle, the hunter removes cap 89 and releases limit ring 79 from its fixed position. The hunter then positions reticule 49 within the image plane by adjusting the reticule's horizontal position via manual movement of platform 51 and by adjusting the reticule's vertical position via manual rotation of member 57. A particular viewing side of the reticule is then selected by rotation of holder 63, as described hereinafter. The stop limit ring 79 is then locked into a position with stop 81 contacting stop 83. Cap 89 is then snapped back onto lug 85.

Reticule 49 is illustrated in greater detail in FIGS. 7 and 8. Reticule 49 is polygonal in shaped and is formed of a translucent material. Each planar side of reticule 49 carries engraved indicia for permitting the hunter to determine the range and sitings of selected targets. An individual side of reticule 49 is selectable by the hunter via movement of handle 69.

Referring to FIG. 7, one side of reticule 49 is illustrated in which an engraved circle or dot 91 is located centrally in the upper portion of the reticule image which will appear in the second image plane 29. Because reticule 49 is inverted by inverter tube 27, the reticule appears to extend from bottom to top (FIG. 7) instead of as it really extends from top to bottom (FIG. 5).

Reticule 49 also includes engraved indicia of military figures 93, 95, 97, 99, 101 and 103, for use in connection with military warfare. Each figure 93-103 is visually associated with a respective bullet-drop compensation aiming point 105, 107, 109, 111, 113 and 115 disposed vertically with respect to dot 91.

The apparent size of the target object 117 as seen through the scope reduces itself, e.g., by $\frac{1}{2}$ in size for every 100 yards increase in distance from the scope. As the scope is zoomed to change magnification of the object, the engraved indicia also change in magnification proportionally. As the rifleman views the object 117 through the scope, he need only match the size of object 117 (the target in the field) with one of the engraved figures 93-103. By superimposing the engraved figure atop the object 117 for matching, the hunter determines the correct range of the object and aiming point for firing at the object.

Each of figures 93-103 are shaped to indicate the size of an object at a specific range. For example, figure 93 indicates that the object is 300 yards away when the object viewed through the scope fills the outline of figure 93. Similarly, figures 95-103 represent distances of 400, 500, 600, 700 and 800 yards respectively. Particularly, even the head of figures 93-103 are sized to indicate the range of the object in the event that the head of the object alone can be seen through the scope.

The amount of drop of the bullet is represented by the aiming points 105-115 which are visually associated with a separate figure 93-103. If the size of the object does not exactly match a figure, the rifleman will estimate a vertical siting point lying somewhere between the two points associated with the figures between which the size of the object lies. As will suggest itself, figures 93-103 may be alternately placed on either side of the vertical passing through dot 91.

Referring to FIG. 8, reticule 49 is illustrated with engraved indicia for use by a game hunter. The engraved indicia includes a plurality of superimposed circles 118 meeting at a single point on each of the circumferences of the circles. An object of a deer 119 is shown as viewed by the hunter through the scope. The hunter will position the gun so that the engraved circles 118 of reticule 49 will cover the deer 119. The conventional 18 inch distance, illustrated by arrow 121, lying between the shoulder and the brisket of the deer is judged against circles 118 for determining the range of the deer in a fashion similar to that described with reference to FIG. 7.

Each of the circles 118 are visually associated with different range distances 121. The separate range distances 121 have corresponding aiming points 123 vertically disposed below dot 91, as shown. The matching of one of the circles 118 provides the correct range distance 121 which is then used to select the proper aiming point 123.

As shown in FIG. 8, the superimposing of a plurality of circles 118 serves to compact the hunter's range finder at a smaller visual area on reticule 49. This affords room for further game circle groups 125, 127 for use for different game. For example, game circle group 118 may be used for deer, whereas game circle group 125 may be used for coyote.

As described above, reticule 49 is polygonal in shape having a plurality of planar side faces each of which may bear engraved indicia and each of which are selectively movable into the field of view of the hunter. Each planar face of reticule 49 may be used to accomodate a different family of bullets. For example, one side of reticule 49 may include range indicia which corresponds to bullet weights of 150 grains and leaving the muzzle at a particular velocity. A second side of reticule 49, for example, may correspond to a bullet weight of 180 grains and leaving the barrel at another particular velocity.

Also, a second reticule carrying member 57 may be included on platform 51 such that the second reticule carrying member 57 is positioned outside of the field of view of the inverting tube when using the first carrying member. The hunter may then rotate the second carrying member into view for using different indicia if needed.

Where reticule 49 is a four sided reticule, the two sides of the reticule will not be seen when viewing the front side of the reticule as shown in FIG. 7. Reticule 49 may be shaped so that the back side of reticule 49 lies in a plane spaced sufficiently away from image plane 25 such that the engraved indicia on the back side of reticule 49 will not be seen through the reticule by the hunter. Where the reticule is thinly shaped so that the engraved indicia on the back side of reticule 49 may be seen, the indicia will nonetheless appear on the right side of the vertical as viewed from FIG. 7 and thus may be discarded by the hunter.

Figure 9A:
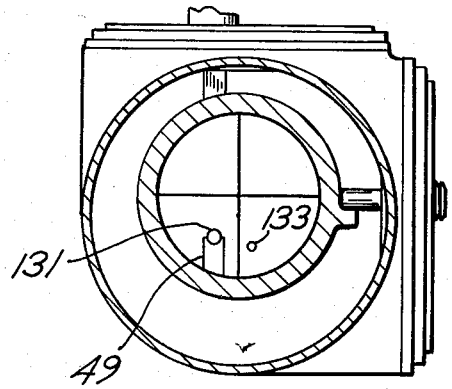
FIGS. 9A through 9D are cross sectional views of the scope embodiment of FIG. 1.

Referring to FIGS. 9A through FIG. 9D, a proper adjustment of the two reticules will be described in order to explain how the scope is properly sited, requiring only that a single bullet is fired. Referring to FIG. 9A, the hunter aims at a target 131 using the siting dot 91 carried by reticule 49. The gun is then fired resulting in a bullet hole 133 shown to the right of the target as seen in FIG. 9A. Reticule 49 is shown off the center of the cross-hair reticule in FIG. 9A, for description purposes; however, the hunter should begin with the secondary and primary reticule aligned to eliminate parallax.

Figure 9B:
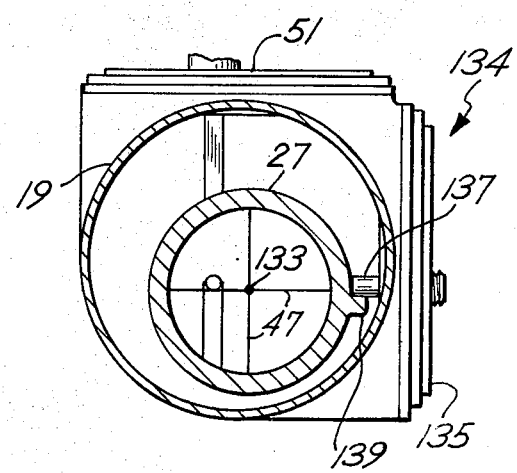

With the secondary reticule held on the target, the primary reticule is effectively adjusted with respect to bullet hole 133 for placing the center of the cross-hair wires atop the bullet hole, as shown in FIG. 9B. As described above, primary reticule 47 is effectively positioned by manipulation of the forward end of inverting tube 27. Rather than using a pair of screw adjustments as described above, the preferred embodiment utilizes a single adjustable control 134 which is similar in structure to the secondary reticule adjustment control of FIG. 5.

Adjustment control 134 includes a rotatable platform 135 (FIG. 4) which carries an arm 137 which is offset from the rotational axis of platform 135. Arm 137 engages inverting tube 27 for moving the same vertically with respect to tube housing 19 during rotation of platform 135, in a fashion similar to that described with respect to the horizontal movement of reticule 49 by platform 51 (FIG. 5). Member 137 is screw mounted to platform 135 such that member 137 may be horizontally moved relative to member 135 in order to horizontally position inverter tube 27, in a fashion similar to the vertical positioning of reticule 49 by member 57. As understood, the ocular end of inverter tube 27 may take on very, very slight movement during the very small movement of the forward end of the tube by control 134.

Arm 137 may be connected to inverter tube 27 in several ways. For example, a bearing surface member 139 may be offset from tube 27 having an upper surface for engaging arm 137. Biasing member 46 (FIG. 2) may bias member 139 against arm 137 for facilitating control adjustment of the inverter tube during rotation of platform 135 and rotation of arm 137, as will be understood.

Figure 9C:
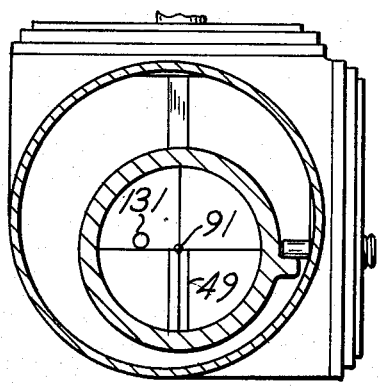
Figure 9D:
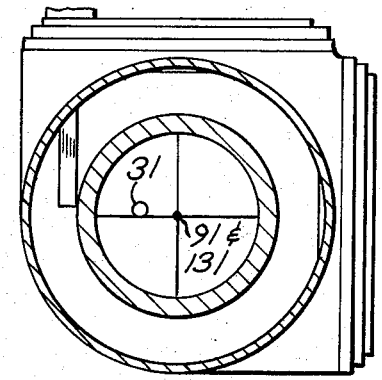

After the primary reticule has been effectively positioned relative to the viewed bullet hole 133 (FIG. 9B), the secondary reticule 49 is then adjustably positioned to carry its siting dot 91 in coincidence with the center of the cross-hair wires of the primary reticule as shown in FIG. 9C. The adjustment of the secondary reticule is explained above with reference to FIG. 5. The secondary reticule adjustment components are manipulated by the hunter to permit the hunter to quickly move the secondary reticule outside of the field of view of the hunter as shown in FIG. 9D, and for quickly turning the reticule back into its sited position as illustrated in FIG. 9C.

The hunter now has his rifle scope properly sited by two spaced apart reticules. Both reticules may be utilized to overcome parallax, by aiding the operator in positioning his eye at a proper location which aligns both reticules in order to aim the rifle.

The indicia engraved on reticule 49 as illustrated in FIGS. 7 and 8 may be microengraved such that the indicia is only visible at higher powers of the scope. Thus when shooting long range game, the hunter zooms the scope to full power and the engraved indicia become visible for the hunter's use to compensate for bullet drop. By zooming to low power, the engraved indicia become invisible to the eye of the hunter except for dot 91 which is utilized together with the center point of the cross-hair wires for aiding the hunter to properly position his eye in order to overcome parallax when shooting game at close range. The dot 91 may comprise two etched circles one of which appears as a dot at low power and the other of which appears as a dot at high power, as will suggest itself.

In order to overcome windage effects on the bullet, horizontal aiming marks 141 may be etched on reticule 49 as illustrated in FIG. 8. The hunter may then utilize the siting procedure described with reference to FIGS. 9A through 9D for determining the effects of windage on his bullet and for repositioning the primary reticule to mark a horizontal aiming point accordingly. For example, where a hunter is in a sitting position on a windy day waiting for his particular game to move by a well-known path of travel or feeding area, the hunter may fire a trial shot at a stationary object. The hunter may then readjust the position of the primary reticule 47 to align with the bullet hole while keeping the dot 91 of the secondary reticule on the target at which he fired. The primary reticule will then indicate the horizontal aiming point which is to be used to site subsequent moving game, assuming the wind continues at approximately the same velocity. That is, if the hunter notices that the wind continues when the game approaches, he merely needs to use primary reticule 47 as his sight upon which to fire. If the hunter notes that the wind has died down, he merely uses the dot 91 of the secondary reticule which is still in line with the barrel of the rifle.

This same procedure to overcome windage effects may be used to overcome mirage effects. For example, the hunter fires a trial shot at a stationary object which he views through the scope and which will be viewed at a position in actuality located above the object. That is, the hunter fires at the mirage of the object. The bullet will hit the mirage aimed at (not the target). The actual bullet hole itself will provide a mirage above the point aimed at previously. The hunter then readjusts the position of the primary reticule 47 to align with the mirage of the bullet hole while keeping the dot 91 of the secondary reticule on the target at which he fired.

It should be understood, of course, that the foregoing description refers to preferred embodiments of the invention and that modifications or alterations may be made therein without departing from the spirit or scope of the invention as set forth forth in the appended claims.

What is claimed is:

1. A telescope sight for sighting-in and aiming a firearm, comprising:
    objective lens means for presenting an object onto an image plane;
    inverting tube means positioned relative to said image plane for inverting the object image appearing in said image plane;
    occular lens means for presenting the inverted object image for viewing;
    a primary reticule for constantly defining the center point of the field of view of the sight for defining a first aiming sight position through the telescope sight, said primary reticule positioned at and in a fixed relationship with one end of said inverting tube means, said one end being the end disposed more distally from said image plane;
    first adjustment means manually actuable for positioning the other end of said inverting tube means relative to said one end, for adjusting said first aiming sight position of said primary reticule relative to the bore of the firearm;
    a secondary reticule located at said image plane for establishing a reference point which defines the relationship of the primary reticule to the bore of the firearm, with respect to which said first adjustment means may be actuated for aligning the reticules to sight-in the firearm, said secondary reticule being movable both horizontally and vertically in said image plane independent of said inverting tube means; and
    second adjustment means for moving said secondary reticule relative to said primary reticule for establishing said relationship.

2. A sight according to claim 1 wherein said secondary reticule is retractable outside of the field of view of said inverting tube means.

3. A sight according to claim 1 wherein said secondary reticule is rotatable about a fixed axis; and further including knob means connected to said secondary reticule and manually rotatable for controlling the relative position of said secondary reticule.

4. A sight according to claim 1 and further including a platform member rotatably mounted for movement in a plane orthogonal to the image plane; and wherein said secondary reticule is connected to said platform member for conjoint movement therewith.

5. A sight according to claim 4 wherein said secondary reticule is extendable relative to said platform member.

6. A sight according to claim 1 wherein said secondary reticule includes indicia visible solely at a power higher than the lowest power of the sight.

7. A sight according to claim 1 wherein said secondary reticule is translucent, said secondary reticule bearing range indicia.

8. A sight according to claim 7 wherein said second reticule includes windage marks.

9. A telescope sight for use with a firearm, comprising:
    objective lens means for presenting an object onto an image plane;
    inverting tube means positioned relative to said image plane for inverting the object image appearing in said image plane;
    occular lens means for presenting the inverted object image for viewing;
    a primary redicule positioned in a fixed relationship with one end of said inverting tube means, said one end being the end disposed more distally from said image plane;
    first adjustment means manually actuable for positioning the other end of said inverting tube means relative to said one end, for adjusting said primary reticule relative to the image formed in said image plane;
    a secondary reticule for movement both horizontally and vertically in said image plane independent of said inverting tube means, said secondary reticule being translucent and bearing range indicia which includes stadia means for correlating extent of range of the object viewed through the gun sight; said secondary reticule bearing bullet drop compensating marks visually associated with said stadia means for indicating the sight position for aiming at the object; and
    second adjustment means for moving said secondary reticule relative to said primary reticule.

10. A sight according to claim 9 wherein said stadia means includes a plurality of superimposed figures.

11. A sight according to claim 10 wherein said superimposed figures are circles contacting at a single point on their respective circumferences.

12. A sight according to claim 10 wherein said stadia means includes a plurality of groups of a plurality of superimposed figures.

13. A telescope sight for use with a firearm, comprising:
    objective lens means for presenting an object onto an image plane;
    inverting tube means positioned relative to said image plane for inverting the object image appearing in said image plane;
    occular lens means for presenting the inverted object image for viewing;
    a primary reticule positioned in a fixed relationship with one end of said inverting tube means, said one end being the end disposed more distally from said image plane;

first adjustment means manually actuable for positioning the other end of said inverting tube means relative to said one end, for adjusting said primary reticule relative to the image formed in said image plane;

a secondary reticule for movement both horizontally and vertically in said image plane independent of said inverting tube means, said secondary reticule being retractable outside of the field of view of said inverting tube means; and second adjustment means for moving said secondary reticule relative to said primary reticule;

setable limit stop means for manually setting a position of stop of said secondary reticule along its path of movement, for permitting manual movement of said secondary reticule from a retracted position outside the field of view of said inverting tube means to a preset position defined by said limit stop means.

14. A telescope sight for use with a firearm, comprising:

objective lens means for presenting an object onto an image plane;

inverting tube means positioned relative to said image plane for inverting the object image appearing in said image plane;

occular lens means for presenting the inverted object image for viewing;

a primary reticule positioned in a fixed relationship with one end of said inverting tube means, said one end being the end disposed more distally from said image plane;

first adjustment means manually actuable for positioning the other end of said inverting tube means relative to said one end, for adjusting said primary reticule relative to the image formed in said image plane;

a secondary reticule for movement both horizontally and vertically in said image plane independent of said inverting tube means;

second adjustment means for moving said secondary reticule relative to said primary reticule; and a platform member rotatably mounted for movement in a plane orthogonol to the image plane; and wherein said secondary reticule is connected to said platform member for conjoint movement therewith, said secondary reticule being extendable relative to said platform member, and said secondary reticule including a first reticule portion and a second reticule portion; said secondary reticule being rotatably mounted to said platform member for selective presentation of one of said first and said second reticule portions in a position for display when viewing through said inverting tube means.

15. A telescopic gunsight comprising a primary reticule; means for adjusting said primary reticule horizontally and vertically with respect to the axis of the gunsight; auxiliary sighting means mounted in said telescopic gunsight, said auxiliary sighting means including an auxiliary reticule selectively movable horizontally and vertically with respect to said primary reticule, said auxiliary reticule being selectively movable from an operative position wherein it is visible in the field of view of the gunsight to an inoperative position wherein it is not visible in the field of view; means mounting said auxiliary reticule in the gunsight; and setable limit stop means for manually setting a position of stop of said auxiliary reticule along its path of movement, for permitting manual movement of said auxiliary reticule from a retracted position outside the field of view of the gunsight to a present position defined by said limit stop means within said field of view.

16. A telescopic gunsight comprising a primary reticule; means for adjusting said primary reticule horizontally and vertically with respect to the axis of the gunsight; auxiliary sighting means mounted in said telescopic gunsight, said auxiliary sighting means including an auxiliary reticule selectively movable horizontally and vertically with respect to said primary reticule, said auxiliary reticule being selectively movable from an operative position wherein it is visible in the field of view of the gunsight to an inoperative position wherein it is not visible in the field of view; said auxiliary reticule including a first reticule surface and a second reticule surface, said auxiliary reticule being manually controllable for selective presentation of one of said first and said second reticule surfaces in a position for display in the field of view of the gunsight; and means mounting said auxiliary reticule in the gunsight.

17. A telescopic gunsight comprising a primary reticule; means for adjusting said primary reticule horizontally and vertically with respect to the axis of the gunsight; auxiliary sighting means mounted in said telescopic gunsight, said auxiliary sighting means including an auxiliary reticule selectively movable horizontally and vertically with respect to said primary reticule, said auxiliary reticule being selectively movable from an operative position wherein it is visible in the field of view of the gunsight to an inoperative position wherein it is not visible in the field of view; said auxiliary reticule including range indicia visible solely at a power higher than the lowest power of the sight, said range indicia including stadia means for correlating extent of range of the viewed object through the gunsight; said auxiliary reticule bearing bullet drop compensating marks visually associated with said stadia means for indicating the sight position for aiming at the object; and means mounting said auxiliary reticule in the gunsight.

18. A telescopic gunsight comprising a primary reticule; means for adjusting said primary reticule horizontally and vertically with respect to the axis of the gunsight; an aperture formed in the telescopic gunsight at its upper end; auxiliary sighting means mounted in said telescopic gunsight, said auxiliary sighting means including an auxiliary reticule selectively movable horizontally and vertically with respect to said primary reticule, said auxiliary reticule being selectively movable from an operative position wherein it is visible in the field of view of the gunsight to an inoperative position wherein it is not visible in the field of view; said auxiliary sighting means comprises a first cylindrical plug mounted in said aperture end rotatable about its central axis; a rotatable member threadably mounted in said plug offset from the central axis thereof and extending downwardly therefrom; said auxiliary reticule being connected to the lower end of said rotatable member; and means mounting said auxiliary reticule in the gunsight.

19. A gunsight according to claim 18 wherein the rotational movement of said plug relative to said aperture causes said auxiliary reticule to be moved horizontally relative to said primary reticule, and the threadable movement of said rotatable member causes said auxiliary reticule to be moved vertically relative to said primary reticule.

20. A gunsight according to claim 15 and further including knob cap means connectable to said auxiliary siting means for providing a surface for manual gripping by the hunter for controlling the relative position of said auxiliary reticule.

* * * * *